US006934850B2

(12) United States Patent
Sato (10) Patent No.: US 6,934,850 B2
(45) Date of Patent: Aug. 23, 2005

(54) PROGRAM CREATION METHOD AND PROGRAM EXECUTION METHOD

(75) Inventor: Ryuji Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 803 days.

(21) Appl. No.: 09/846,833

(22) Filed: May 1, 2001

(65) Prior Publication Data

US 2001/0042209 A1 Nov. 15, 2001

(30) Foreign Application Priority Data

May 10, 2000 (JP) ........................................ 2000-136549

(51) Int. Cl.[7] .............................................. G06F 11/30
(52) U.S. Cl. ........................ 713/189; 713/190; 713/193; 713/194; 713/200
(58) Field of Search ................................ 713/190, 189, 713/193–194, 200; 380/33, 37

(56) References Cited

U.S. PATENT DOCUMENTS

| | | | | |
|---|---|---|---|---|
| 4,905,277 A | * | 2/1990 | Nakamura .................. | 713/190 |
| 5,892,899 A | * | 4/1999 | Aucsmith et al. ........... | 713/200 |
| 6,049,613 A | * | 4/2000 | Jakobsson .................... | 380/47 |
| 6,205,550 B1 | * | 3/2001 | Nardone et al. ............ | 713/200 |
| 6,772,419 B1 | * | 8/2004 | Sekiguchi et al. .......... | 719/319 |

OTHER PUBLICATIONS

Schneier, Applied Cryptography, 1996, John Wiley & Sons, 2nd Edition, pp. 294–300, 358–363.*
Mambo et al., A Tentative Approach to Constructing Tamper–Resistant Software, 1997, ACM, pp. 23–33.*
"Protection of software against reverse–analysis (tampering) and alteration (modification)—tamper–resistant software technology", *Nikkei Electronics*, 706: 209–220 (1998).

* cited by examiner

Primary Examiner—Gilberto Barron
Assistant Examiner—Minh Dinh
(74) Attorney, Agent, or Firm—Scully, Scott, Murphy & Presser (57) ABSTRACT

First program 10 comprises encrypted code modules 11, 13, and 15, decryption code modules 12a, 14a, and 16a of encrypted code modules 12, 14, and 16, and a first decryption processing code module 30. Also, second program 20 comprises encrypted code modules 12, 14, and 16, decryption code modules 11a, 13a, and 15a of the encrypted code modules 11, 13, and 15, and a second decryption processing code module 31. The encrypted code modules 11–16, which are created by encrypting processing code modules, are not converted back to the processing modules that perform original processing unless they are decrypted by the first and second decryption processing code modules 30 and 31, respectively.

24 Claims, 8 Drawing Sheets

PROGRAM CREATION METHOD AND PROGRAM EXECUTION METHOD

FIELD OF THE INVENTION

The present invention relates to a program creation method and a program execution method, and more particularly to a technology for preventing software from being analyzed dynamically.

BACKGROUND OF THE INVENTION

Conventionally, a software illegal-use prevention technology has been used to prevent a third party from analyzing a high-security program and illegally using it, as described, for example, in "Protection of software against reverse-analysis (tampering) and alteration (modification)—tamper-resistant software technology—", pp. 209–220, Nikkei Electronics Vol. No. 706, Jan., 1998".

One of methods for illegally using software is to use a software debugger etc. to get access to a program in execution for inspecting the behavior of the program by executing the program statement by statement. This is a powerful analysis means for which no complete prevention method is available.

Figure 8:
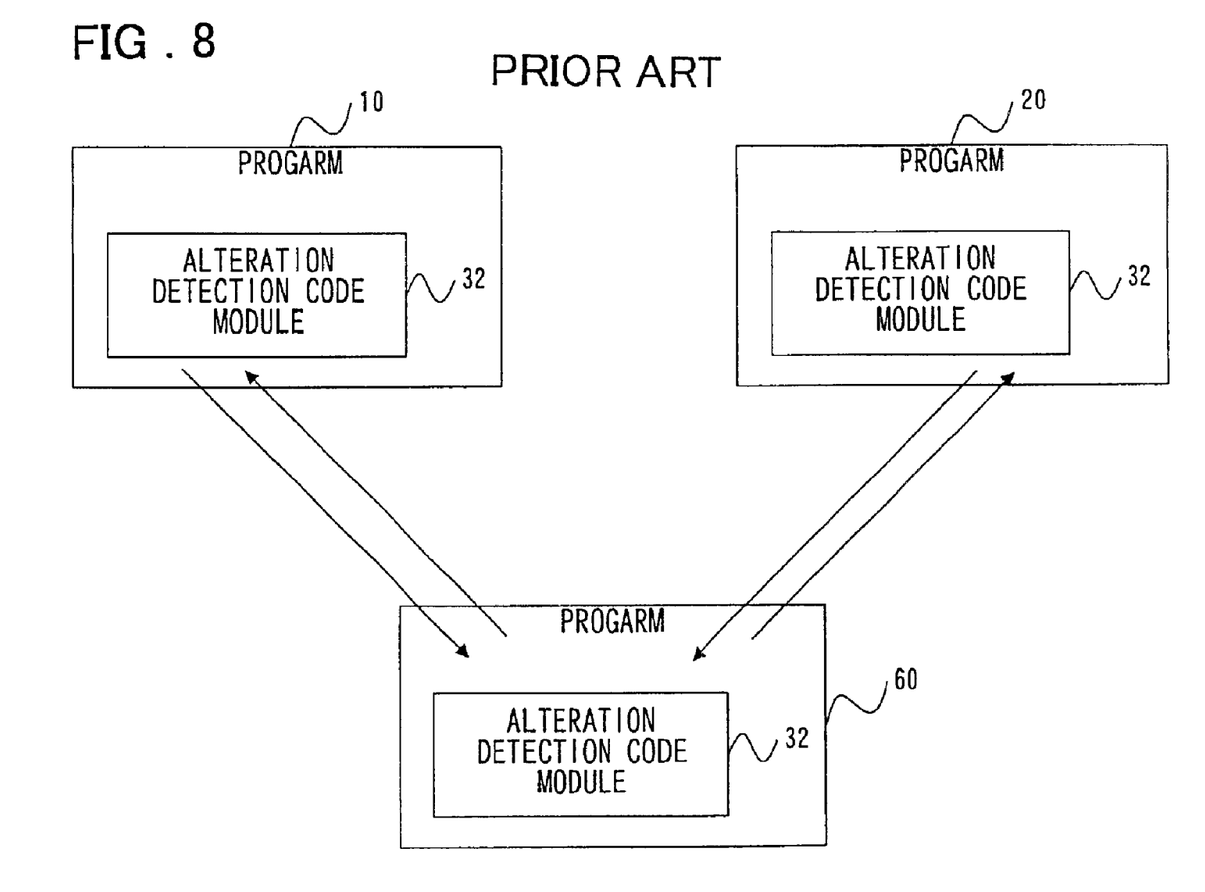
FIG. 8 is a diagram showing a conventional dynamic analysis prevention method.

The following describes a dynamic-analysis prevention technology, as one of illegal-use prevention technologies, described in the document mentioned above. FIG. 8 shows the configuration of the technology. Referring to FIG. 8, programs 10 and 20 are programs to be protected by using the illegal-use prevention technology, and a program 60 is a supervisory program, (System Integrity Program SIP) prepared for the illegal-use prevention technology. Note that the programs 10, 20, and 60 each include an alteration detection code module (Integrity Verification Kernel IVK) 32 for detecting alterations that might be effected on the program itself, respectively.

These programs perform authentication (verification) as follows. The program 10 and the program 60 authenticate (verify) the alteration detection code module (IVK) 32 each other according to a communication protocol through digital signature. In this case, if the alteration detection code module 32 is destroyed or altered, processing stops here immediately.

The program 20 and the program 60 authenticate the alteration detection code module 33 each other according to a communication protocol through digital signature. In this case, if the alteration detection code module 32 is destroyed or altered, processing stops here immediately.

This method allows the processing to be caused/suspended, if the alteration detection code module 32 detects that a dynamic analysis was made. In addition, this method performs authentication for two pairs of programs to prevent an illegal use by a third party program that imitates a communication protocol message.

SUMMARY OF THE DISCLOSURE

One of the problems with the software illegal-use prevention technology described above resides in that, because the alteration detection code module detects merely alterations, the technology can not detect tracing itself underway performed by a software debugger but detects alterations only when the debugger has altered some part of the program.

In view of the foregoing, it is an object of the present invention to provide a program creation method and a program execution method that solve the above problem and prevent a software debugger from making a dynamic software analysis.

According to a first aspect of the present invention there is provided a program creation method wherein encoded code modules are made up of first and second programs that decrypt encoded code modules each other during execution, each of the encoded code modules being generated by encrypting corresponding one of the processing code modules.

According to a second aspect of the present invention there is provided a program execution method wherein, during execution of first and second programs, encrypted code modules are decrypted each other, each of the encoded code modules being generated by encrypting one of processing code modules corresponding to the first program and the second program, respectively.

That is, in the program creation method of the present invention, two programs each having encrypted code modules decrypt the encrypted code modules each other during execution to prevent a software debugger from dynamically analyzing the programs.

More specifically, in the program creation method of the present invention, the first program includes encrypted code modules to be executed at an odd-numbered occurrence during whole processing operation and the second program includes encrypted code modules to be executed at an even-numbered occurrence during the whole processing operation. The first and second programs are configured so that they execute encrypted code modules each other alternately. Any encrypted code module cannot be returned (decrypted) to the original code module unless being decrypted by both the first and second programs.

When the first and second programs are started, the first encrypted code module is decrypted and the first program executes the resultant decrypted code module. Next, the first and second programs decrypt the second encrypted code module and the second program executes the resultant decrypted code module.

By repeating the above processing, the encrypted code module cannot be decrypted completely, when a software debugger attempts to dynamically analyse the first program. The second program, which attempts to execute an incompletely decrypted code module, is terminated because it executes an unauthorised or improper code. The subsequent encrypted code modules are not decrypted completely and, therefore, the first program is also terminated.

The present invention takes advantage of the fact that a software debugger can start and analyze one program at a time and the fact that it takes a longer time to execute dynamic analysis than to execute a standard program. These facts allow programs to be structured to prevent illegal dynamic analysis.

PREFERRED EMBODIMENTS OF THE INVENTION

Figure 1:
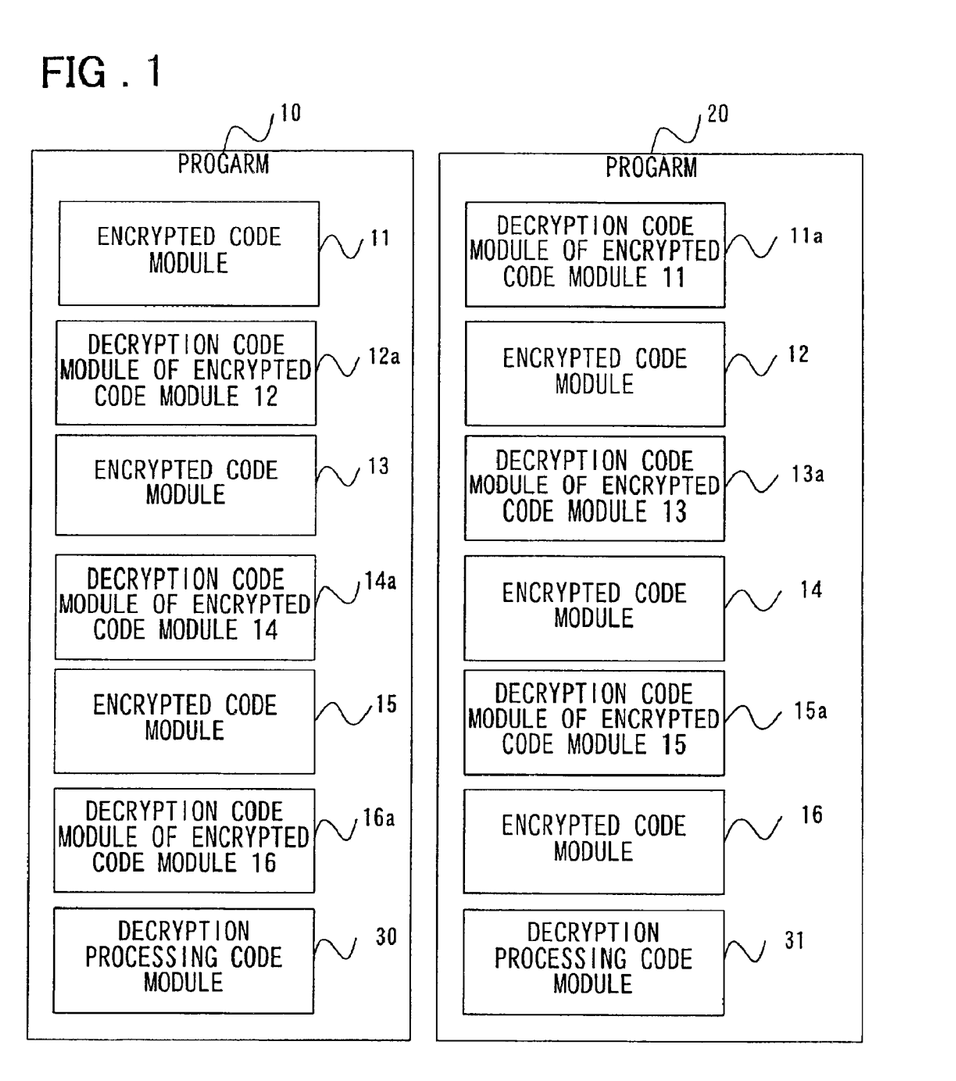
FIG. 1 is a diagram showing the structure of programs used in an embodiment of the present invention.

Some embodiments of the present invention will now be described with reference to the drawings. FIG. 1 is a diagram showing the configuration of programs used in one embodiment of the present invention. Referring to FIG. 1, a (first) program 10 comprises encrypted code modules (i.e., encrypted processing code modules) 11, 13, and 15, decryption code modules 12a, 14a, and 16a of encrypted code modules 12, 14, and 16, and a decryption processing code module 30. Also, a (second) program 20 comprises the encrypted code modules 12, 14, and 16, decryption code modules 11a, 13a, and 15a of the encrypted code modules 11, 13, and 15, and a decryption processing code module 31.

Figure 2:
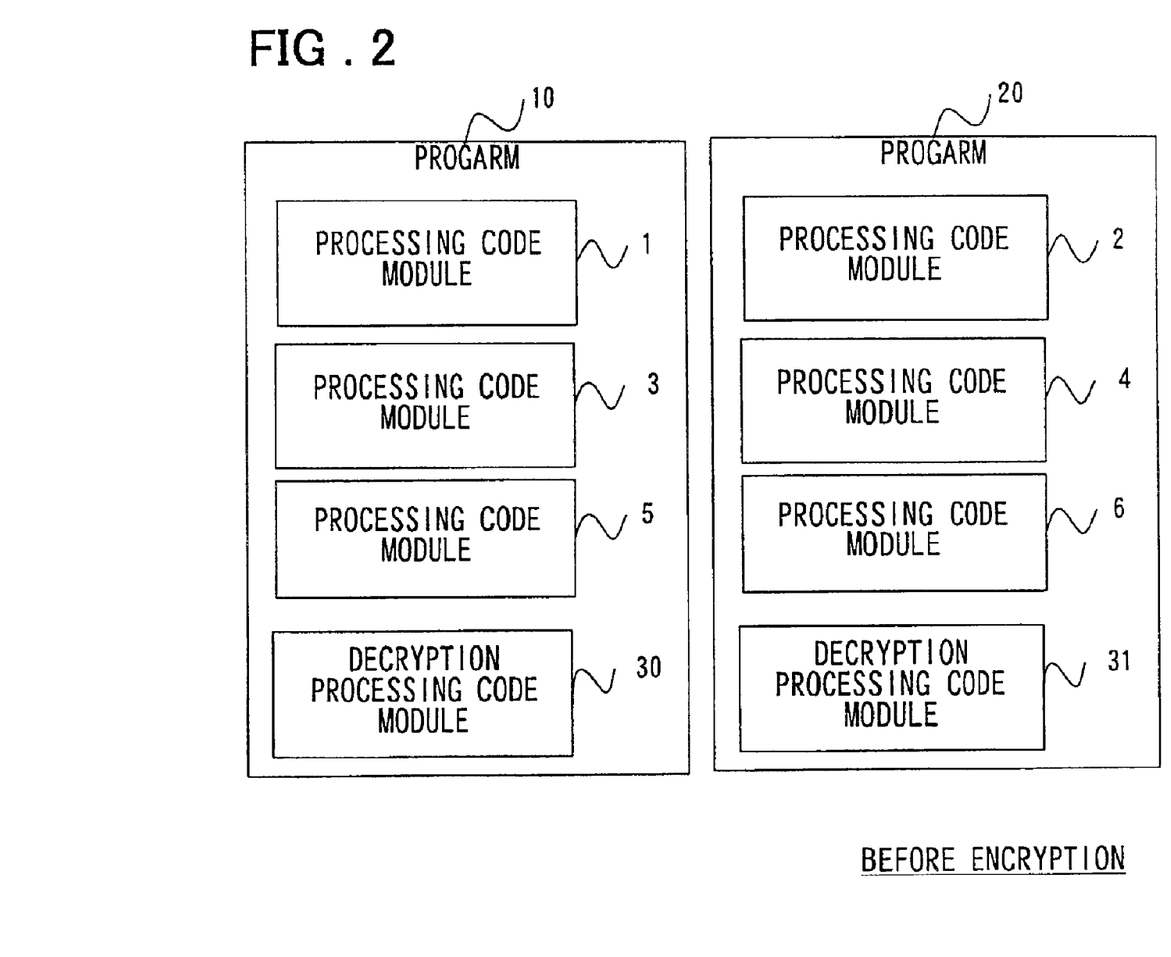
FIG. 2 is a diagram showing programs before being encrypted as in FIG. 1.
Figure 3:
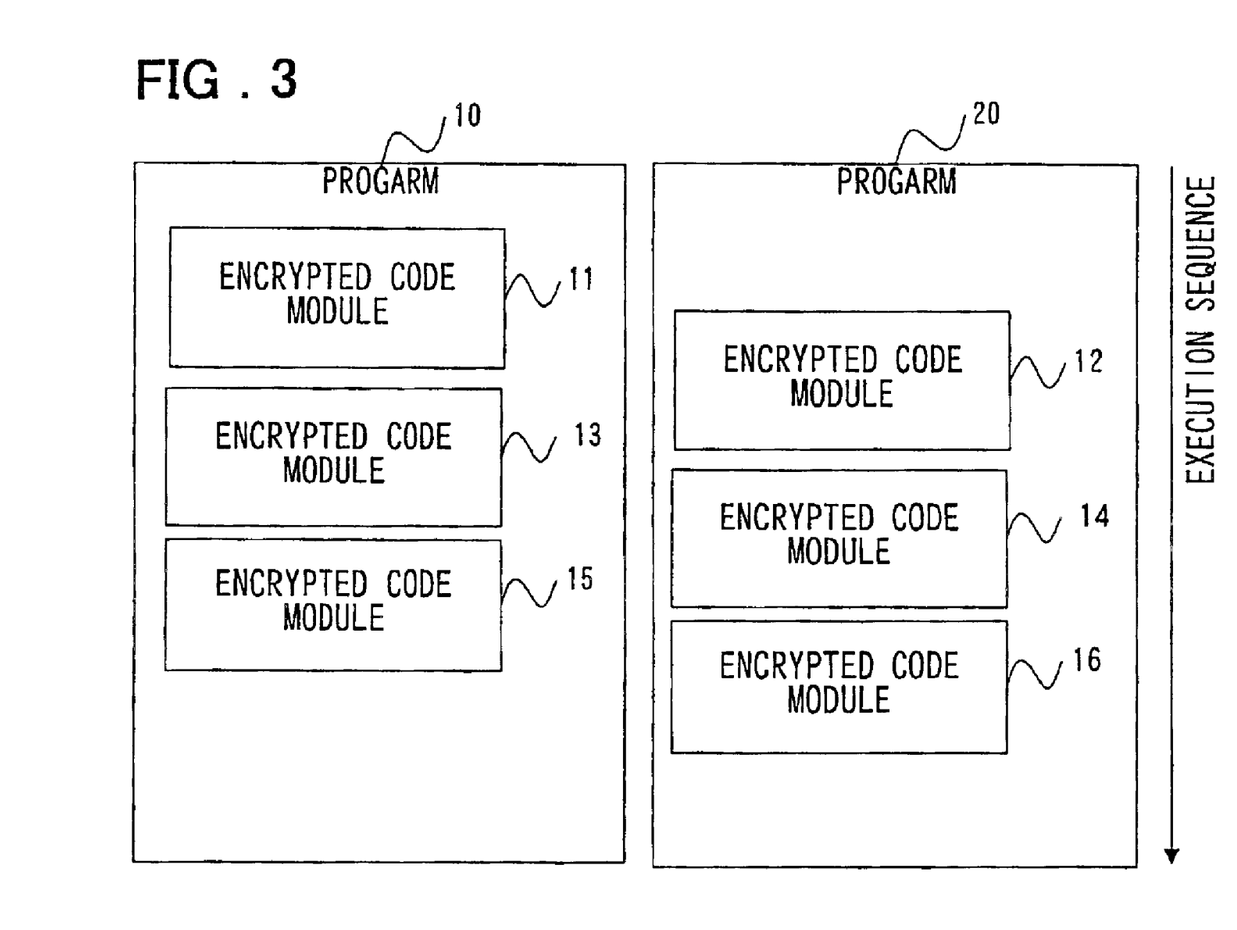
FIG. 3 is a diagram showing a sequence in which the programs in FIG. 1 are executed.

FIG. 2 is a diagram showing the programs in FIG. 1 before being encrypted. In FIG. 2, processing code modules 1, 3, 5 (i.e., add-numbered) and the first decryption processing code 30 are contained in the first program 10, whereas processing code modules 2, 4 and 6 (i.e., add-numbered) and the second decryption processing code 31 are contained in the second program 20. FIG. 3 shows the encrypted code modules 11 to 16 generated by encrypting processing code modules 1–6, respectively. To return those encrypted modules to the processing code modules 1–6 that perform original processing, the encrypted code modules must be decrypted by the decryption processing code module 30 and/or the decryption processing code module 31.

In one embodiment, the decryption processing code module 30 decrypts the encrypted code modules 12, 14, and 16 of the program 20 with the decryption code modules 12a, 14a, and 16a, respectively. Similarly, the decryption processing code module 31 decrypts the encrypted code module 11, 13, and 15 of the program 10 with the decryption code modules 11a, 13a, and 15a, respectively.

FIG. 3 shows an operation sequence in which the programs shown in FIG. 1 are executed. Referring to FIG. 3, the programs 10 and 20 execute the encrypted code modules 11, 12, 13, 14, 15, and 16 in a time-serial manner.

There are many ways of creating encrypted code modules to be executed time-serially in separate programs. In one way, the programs are created using the synchronization mechanism such as the system timer; in another way, encrypted code modules are used for processing modules that are executed in the fixed order such as initialization processing modules, screen drawing (displaying) processing modules, termination processing modules, and so on. It should be noted that the modules must be created such that processing will not be stopped through analysis by a software debugger. When creating encrypted code modules, it is desirable that a system timer be used as a waiting mechanism.

Figure 4:
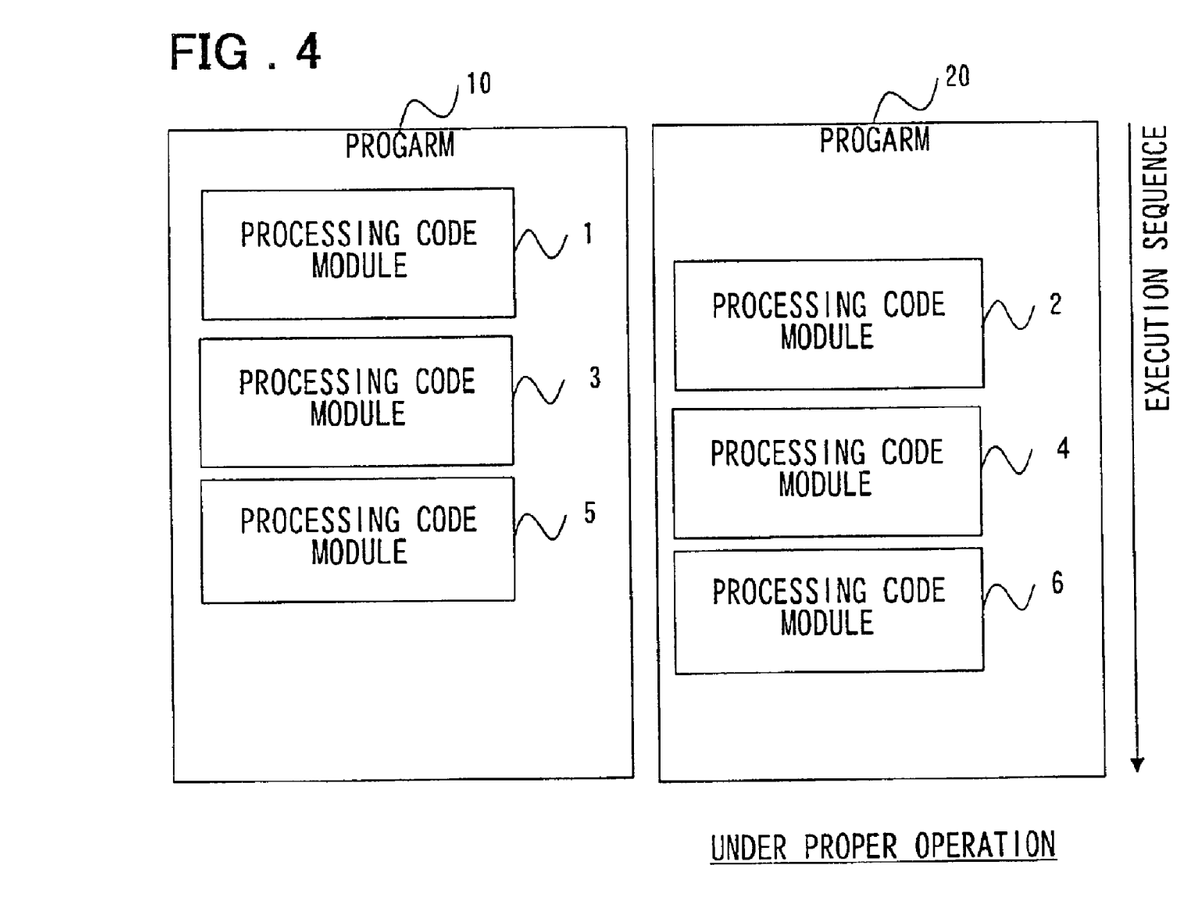
FIG. 4 is a diagram showing the programs that are operating correctly.
Figure 5:
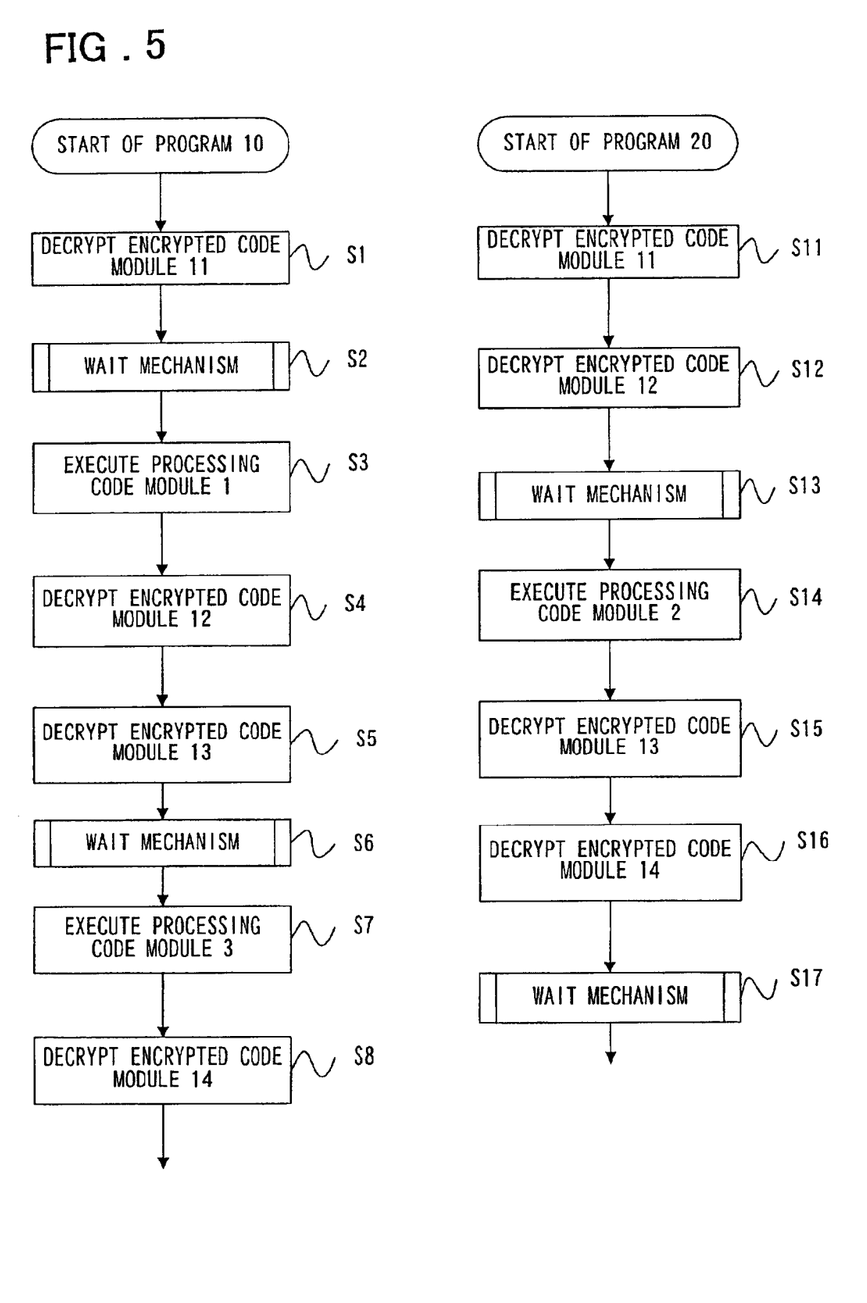
FIG. 5 is a flowchart showing the operation of the programs in FIG. 1.

FIG. 4 is a diagram showing the programs in FIG. 1 that are operating correctly. FIG. 5 is a flowchart showing the operation of the programs in FIG. 1. With reference to FIG. 1, FIG. 4, and FIG. 5, the overall operation of the embodiment of the present invention will be described.

First, when the first program 10 and the second program 20 are started, the first decryption processing code module 30 and the second decryption processing code module 31, which uses the decryption code module 11a, work together to decrypt the encrypted code module 11 to generate the processing code module 1 (steps S1 and S11 in FIG. 5).

At this time, the program (here, first program 10) waiting for decryption uses the waiting mechanism (step S2 in FIG. 5). This waiting mechanism is a routine to synchronize two concurrently running programs, first program 10 and second program 20. The waiting mechanism S2 waits a pre-calculated period of time until the second program 20 decrypts the encrypted code module 11. When the calculated period of time has elapsed, the next step is executed regardless of whether or not the encoded code is decrypted.

After that, the first program 10 executes the processing code module 1 (step S3 in FIG. 5). Then, the first decryption processing code module 30, which uses the decryption code module 12a, and the second decryption processing code module 31 work together to decrypt the encrypted code module 12 to generate the processing code module 2 (steps S4 and S12 in FIG. 5).

At this time, the (second) program waiting for decryption uses the waiting mechanism (step S13 in FIG. 5). After that, the second program 20 executes the processing code module 2 (step S14 in FIG. 5). Then, the first decryption processing code module 30 and the second decryption processing code module 31, which uses the decryption code module 13a, work together to decrypt the encrypted code module 13 to generate the processing code module 3 (steps S5 and S15 in FIG. 5).

At this time, the (first) program waiting for decryption uses the waiting mechanism (step S6 in FIG. 5). After that, the first program 10 executes the processing code module 3 (step S7 in FIG. 5). Then, the decryption processing code module 30, which uses the decryption code module 14a, and the decryption processing code module 31 work together to decrypt the encrypted code module 14 to generate the processing code module 4 (steps S8 and S16 in FIG. 5).

At this time, the second program waiting for decryption uses the waiting mechanism (step S17 in FIG. 5). After that, the second program 20 executes the processing code module 4. The first and second programs 10 and 20 continue processing in this manner.

This procedure prevents the programs 10 and 20 from being analyzed even when a debugger (not shown in the figure) attempts to dynamically debug either one of the programs 10 and 20.

Figure 6:
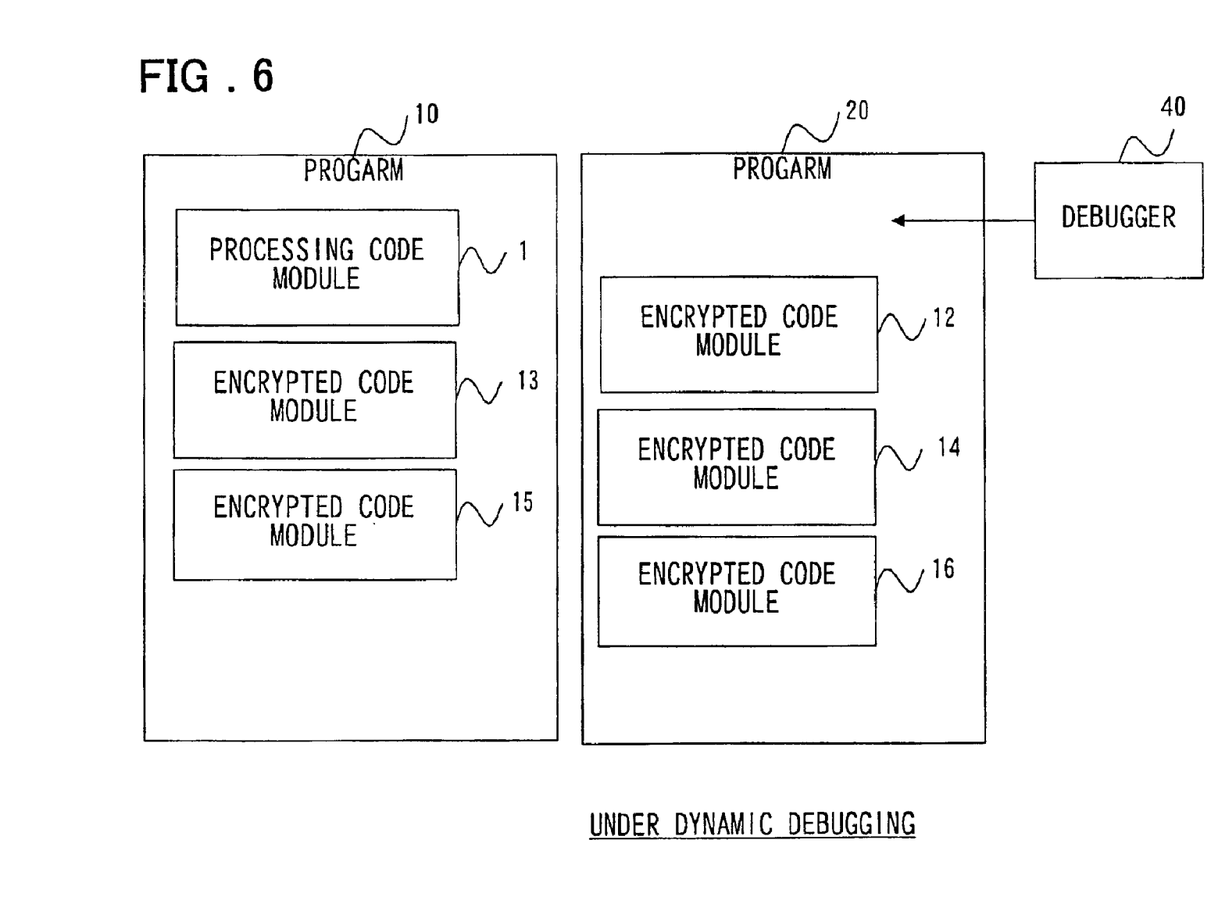
FIG. 6 is a diagram showing the programs in FIG. 1 that are being dynamically debugged.

FIG. 6 shows a state where a debugger dynamically debugs the programs shown in FIG. 1. In FIG. 6, for example, a debugger 40 is going to dynamically analyze the second program 20 that is under execution.

In this case, when the first program 10 and the second program 20 start processing, the first and second decryption processing code modules 30 and 31 decrypt the first encrypted code module 11 to generate the first processing code module 1 which is executed by the first program 10.

The second program 20, if debugged with the debugger 40, either temporarily stops execution or allows the user (operator) of the debugger 40 to execute steps, with a slowed-down processing speed.

The first decryption processing code module 30 decrypts part of the encrypted code module 12 (resulting in incomplete processing code module 2) and, at the same time, the first decryption processing code module 30 decrypts part of the encrypted code module 13 (resulting in incomplete processing code module 3). When the first program 10 executes the incomplete processing code module 3, the operating system terminates the first program 10 assuming that an illegal processing has been performed.

The second decryption processing code module 31 decrypts the incomplete processing code module 2 to generate the processing code module 2, and the second program 20 executes the processing code module 2. When the second decryption processing code module 31 decrypts part of the encrypted code module 14 (resulting in an incomplete processing code module 4), and the second program 20 executes the incomplete processing code module 4, the operating system terminates the second program 20 assuming that an illegal processing has been performed.

If the processing of the second program 20, which is under debugging by the debugger 40, lags behind the processing speed shown in FIG. 3, the first program 10 that executes only partially decrypted processing code is terminated because an illegal processing has been performed. Because of this, the second program 20 that also executes only partially decrypted processing code is terminated because the illegal processing has been performed. At this time, the analysis by the debugger 40 also terminates.

In this way, two programs—first program 10 and second program 20—are structured so that they decrypt stepwise each other, i.e., one program decrypt one encrypted code module of the other program one by one. If either one of the programs is debugged, this program structure prevents the decryption procedure from being executed correctly (i.e., in a correct timing sequence) and terminates the programs because of improper processing. Therefore, the debugger 40 cannot complete a dynamic software analysis.

Although the method described above uses two programs, that is, the first program 10 and the second program 20, it is also applicable not only to two programs but also to N programs (N is an integer equal to or larger than 3). When the number of the programs is increased to N, the first program 10 and the second program 20 decrypt encrypted code modules each other, . . . program N-1 and program N decrypt encrypted code modules each other, and program N and the first program 10 decrypt encrypted code modules each other. This makes the programs more difficult to be analysed, as a whole.

In FIG. 1 and FIG. 2, the decryption processing code modules 30 and 31 may be included in processing code modules 1 to 6. Including the decryption processing code modules 30 and 31 into any one of the processing code modules 1 to 6 in this manner further reduces the danger that a third party may analyze the programs.

In addition, in the flowchart shown in FIG. 5, synchronization may be established not only by the waiting mechanism but also by a synchronized processing performed by a third program. In this case, this program sends a decryption permission message sequentially to the first program 10 and the second program 20. For example, upon recognising that step S11 has been ended, the third program sends the wait end message to the first program 10 waiting in step S2.

In case where this method is employed, it is also possible to prevent the third program from dynamically analyzing the programs. To do so, an instruction coding is added to the waiting mechanism that causes control to be passed to the next step if no message is received for a predetermined period of time.

Figure 7:
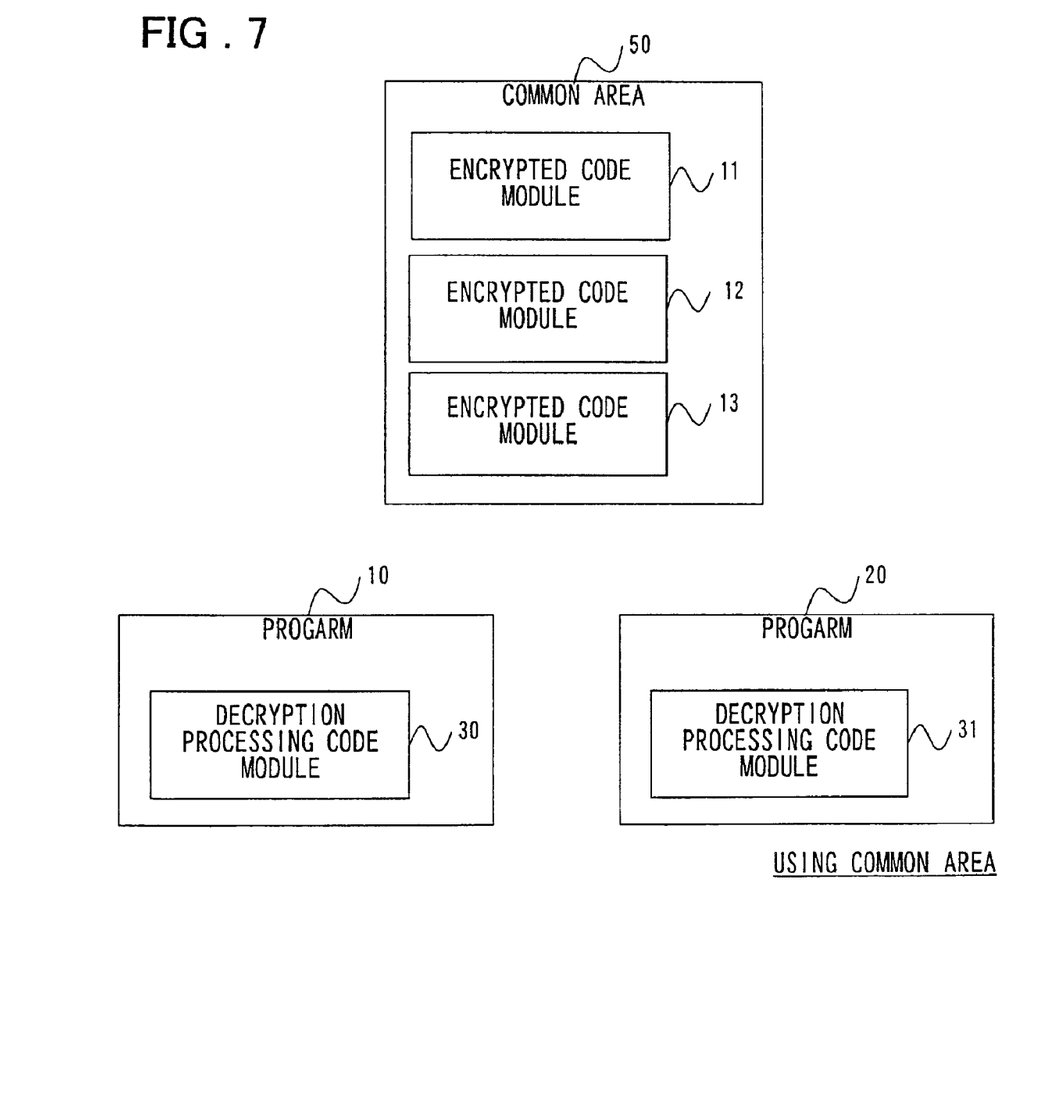
FIG. 7 is a diagram showing the structure of programs in another embodiment of the present invention.

FIG. 7 is a diagram showing the structure of programs in another embodiment of the present invention. Referring to FIG. 7, a first program 10 and a second program 20 each include a first decryption processing code module 30 and a second decryption processing code module 31, respectively. Encrypted code modules 11–13, which are decrypted each other, are placed, not in the first program 10 and the second program 20, but in a common program area 50 (that is provided separately).

As shown in FIG. 7, the first and second programs 10 and 20 decrypt the encrypted code modules 11–13 in the common area 50 and execute the respective processing codes allocated to each of the first and second programs. In a system where rewriting (or transfer of) the encoded code module of another program is difficult because of the operating system specifications, this method gives same advantage as the one described above.

The above disclosed method and process steps are realised by a computer readable program product comprising the steps for performing any one of the methods.

The meritorious effects of the present invention are summarized as follows.

According to the present invention described above, creating first and second programs that decrypt the corresponding processing code modules each other at execution time prevents a software debugger from making a dynamic software analysis.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A program creation method comprising:

generating a first encoded code module and a second encoded code module by encrypting corresponding processing code modules; and creating a first program configured to decrypt the second encoded code module and a second program configured to decrypt the first encoded code module during execution, wherein each of said first and second programs waiting for decryption waits for a pre-calculated period of time, and after the pre-calculated period of time has elapsed, executes a next processing regardless of whether or not the decryption is completed.

2. The program creation method as defined by claim 1, wherein said first and a first decryption processing code module decrypt the second encrypted code modules, and said second program and a second decryption processing code module decrypt the first encrypted code module.

3. The program creation method as defined by claim 2, wherein said first program includes encrypted code modules to be executed in an odd-numbered sequence during whole processing operation; and said second program includes encrypted code modules to be executed in an even-numbered sequence during the whole processing operation.

4. The program creation method as defined by claim 1, wherein said first and second programs each have a decryption processing code module decrypting the encrypted code modules; and the encrypted code modules are generated so as to be included in a common area common through said first and second programs.

5. The program creation method as defined by claim 2, wherein the decryption processing code module is created so as to be included in the processing code modules.

6. The program creation method as defined by claim 2, wherein each of said first and second programs is created so as to be terminated abnormally when a lag occurs in the decryption of the respective encrypted code modules upon dynamic analysis by a software debugger.

7. The program creation method as defined by claim 2, wherein the encrypted code modules are configured so as not to be returned to the original processing code modules unless being decrypted by both of said first and second programs.

8. The program creation method as defined by claim 2, wherein said first and second programs are generated by the steps comprising:

decrypting the first encrypted code module by said first and second programs when said first and second programs are started;

executing the resulting first decrypted processing code module by said first program;

decrypting the second encrypted code module by said first and second programs; and executing the resulting second decrypted processing code module by said second program.

9. A program execution method comprising:

generating a first encoded code modules and a second encoded code module by encrypting processing code modules corresponding to each of a first program and a second program; and decrypting said encoded code modules during execution of the first and second programs, wherein each of said first and second programs waiting for decryption waits a pre-calculated period of time, and after the pre-calculated period of time has elapsed, executes a next processing regardless of whether or not the decryption is completed.

10. The program execution method as defined by claim 9, wherein each of said first and second programs is configured so as to have the encoded code modules and a decryption processing code module decrypting the encrypted code modules.

11. The program execution method as defined by claim 10, wherein said first program includes encrypted code modules to be executed in an odd-numbered sequence during whole processing operation, and wherein said second program includes encrypted code modules to be executed in an even-numbered sequence during the whole processing operation.

12. The program execution method as defined by claim 9, wherein said first and second programs each have a decryption processing code module decrypting the encrypted code modules, and wherein the encrypted code modules are configured so as to be included in a common area common through said first and second programs.

13. The program execution method as defined by claim 10, wherein the decryption processing code module is configured so as to be included in the processing code modules.

14. The program execution method as defined by claim 10, wherein each of said first and second programs is configured to be terminated as abnormal when a lag occurs in the decryption of the encrypted code modules during dynamic analysis by a software debugger.

15. The program execution method as defined by claim 10, wherein the encrypted code modules are configured so as not to be returned to the original processing code modules unless being decrypted by both of said first and second programs.

16. The program execution method as defined by claim 10, comprising the steps of:

decrypting a first encrypted code module by said first and second programs when said first and second programs are started;

executing a resulting first decrypted processing code module by said first program;

decrypting a second encrypted code module by said first and second programs; and executing a resulting second decrypted processing code module by said second program.

17. A program creation method comprising:

generating encoded code modules by encrypting corresponding processing code modules; and creating first, second . . . to (N−1)th and Nth programs configured to decrypt the encoded code modules, where N is an integer of at least 3, wherein each program is configured to decrypt the encoded module of its neighboring-in-number program during execution, wherein each of said first, second . . . to (N−1)th and Nth programs waiting for decryption waits a pre-calculated period of time, and after the pre-calculated period of time has elapsed, executes a next processing regardless of whether or not the decryption is completed.

18. The program creation method as defined by claim 17, wherein said each programs and its neighboring-in-number program are comprised by:

a pair of the first and second programs;

a pair of (N−1)th and Nth programs; and a pair of Nth and the first programs.

19. A computer readable product incorporating a program creation method, said method comprising:

generating a first encoded code modules and a second encoded code module by encrypting corresponding processing code modules; and creating a first program configured to decrypt the second encoded code module and a second program configured to decrypt the first encoded code module execution, wherein each of said first and second programs waiting for decryption waits for a pre-calculated period of time, and after the pre-calculated period of time has elapsed, executes a next processing regardless of whether or not the decryption is completed.

20. The program product as defined by claim 19, wherein each of said first and second programs is created to have the encoded code modules and a decryption processing code module decrypting the encrypted code modules.

21. The program product as defined by claim 20, wherein the decryption processing code module is created so as to be included in the processing code modules.

22. The program product as defined by claim 20, wherein each of said first and second programs is created so as to be terminated abnormally when a lag occurs in the decryption of the encrypted code modules.

23. The program product as defined by claim 20, wherein the encrypted code modules are configured so as not to be returned to the original processing code modules unless being decrypted by both of said first and second programs.

24. The program product as defined by claim 20, wherein said first and second programs are generated by the steps comprising:

decrypting a first encrypted code module by said first and second programs when said first and second programs are started;

executing a resulting first decrypted processing code module by said first program;

decrypting a second encrypted code module by said first and second programs; and executing a resulting second decrypted processing code module by said second program.

* * * * *